(12) United States Patent
Weaver

(10) Patent No.: US 9,877,531 B2
(45) Date of Patent: *Jan. 30, 2018

(54) SYSTEM FOR DISPLAYING GARMENTS

(71) Applicant: ZENIMAX MEDIA, INC., Rockville, MD (US)

(72) Inventor: Christopher S. Weaver, Darnestown, MD (US)

(73) Assignee: ZENIMAX MEDIA, INC., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,096

(22) Filed: Jan. 22, 2015

(65) Prior Publication Data

US 2015/0199753 A1 Jul. 16, 2015

Related U.S. Application Data

(63) Continuation of application No. 13/453,827, filed on Apr. 23, 2012, now Pat. No. 8,970,585, which is a continuation of application No. 12/343,144, filed on Dec. 23, 2008, now Pat. No. 8,189,000, which is a continuation of application No. 11/627,549, filed on Jan. 26, 2007, now Pat. No. 7,522,165, which is a continuation of application No. 09/923,410, filed on Aug. 8, 2001, now Pat. No. 7,212,202, which is a continuation of application No. 09/329,995, filed on Jun. 11, 1999, now Pat. No. 6,404,426.

(51) Int. Cl.
| | | |
|---|---|---|
| *G06T 15/00* | (2011.01) | |
| *A41H 3/00* | (2006.01) | |
| *G06Q 10/00* | (2012.01) | |
| *G06T 19/00* | (2011.01) | |
| *G06T 13/40* | (2011.01) | |
| *G06T 17/00* | (2006.01) | |
| *G06Q 30/06* | (2012.01) | |

(52) U.S. Cl.
CPC ............. *A41H 3/007* (2013.01); *G06Q 10/00* (2013.01); *G06Q 30/0643* (2013.01); *G06T 13/40* (2013.01); *G06T 15/00* (2013.01); *G06T 17/00* (2013.01); *G06T 19/00* (2013.01); *G06T 2210/16* (2013.01)

(58) Field of Classification Search
USPC .................................................. 345/419, 420
See application file for complete search history.

(56) References Cited

U.S. PATENT DOCUMENTS

| | | | |
|---|---|---|---|
| 4,734,690 A | 3/1988 | Waller | |
| 4,780,960 A | 11/1988 | Merz | |
| 4,926,344 A | 5/1990 | Collins et al. | |
| 5,267,154 A | 11/1993 | Takeuchi | |

(Continued)

FOREIGN PATENT DOCUMENTS

WO   WO 98/15904   4/1998

OTHER PUBLICATIONS

Gray "The Virtual Reality Design Studio", IEEE 1997.*

(Continued)

*Primary Examiner* — Kimbinh T Nguyen
(74) *Attorney, Agent, or Firm* — DLA Piper LLP (US)

(57) ABSTRACT

A system for displaying garments. The system comprises: a model rendering control, a size selection control, a proportion control, a characteristic control, and a fabric rendering control.

15 Claims, 9 Drawing Sheets

(56) References Cited

U.S. PATENT DOCUMENTS

| | | | |
|---|---|---|---|
| 5,363,476 | A | 11/1994 | Kurashige et al. |
| 5,483,630 | A | 1/1996 | Unuma et al. |
| 5,495,568 | A | 2/1996 | Beavin |
| 5,515,268 | A * | 5/1996 | Yoda .......................... 705/26.5 |
| 5,530,652 | A | 6/1996 | Croyle et al. |
| 5,557,527 | A | 9/1996 | Kotaki et al. |
| 5,577,175 | A | 11/1996 | Naka et al. |
| 5,581,665 | A | 12/1996 | Sugiura et al. |
| 5,724,522 | A * | 3/1998 | Kagami et al. ............ 705/26.44 |
| 5,729,673 | A | 3/1998 | Cooper et al. |
| 5,745,666 | A | 4/1998 | Gilley et al. |
| 5,818,420 | A | 10/1998 | Mitsumine et al. |
| 5,850,222 | A | 12/1998 | Cone |
| 6,026,179 | A | 2/2000 | Brett |
| 6,196,429 | B1 | 3/2001 | Cavdek et al. |
| 6,307,568 | B1 | 10/2001 | Rom |
| 6,404,426 | B1 | 6/2002 | Weaver |
| 6,634,949 | B1 | 10/2003 | Briggs et al. |
| 6,968,075 | B1 | 11/2005 | Chang |
| 7,062,454 | B1 * | 6/2006 | Giannini et al. ........... 705/26.81 |
| 7,212,202 | B2 | 5/2007 | Weaver |

OTHER PUBLICATIONS

U.S. New & World Report, *Business & Technology: Your Every Command*, Jul. 5, 1999.

Fortune, *Fortune's Information Technology Special Report*: boo. com, Jul. 5, 1999.

Public Technologies Multimedia Announces Exclusive Agreement With Macy.com and Broderbund, Sep. 23, 1999.

www.landsend.com, "Welcom to My Virtual Model" Jan. 23, 1999.

Steve Fidel: "Internet now lets shoppers try on clothes" Copyright 1999 The Deseret News Publishing Co., Salt Lake City, Jun. 23, 1999.

Gray S:, "The virtual reality design studio" Industrial Electronic, 1997. ISIE 97., Proceedings of the IEEE International Symposium Onguimaraes, Portual Jul. 7-11, 1997, New York, NY, USA, IEEE, US, vol. 1, Jul. 7, 1997.

Ying Yang et al: "Three-Dimensional Garment Design and Animation. A New Design Tool for the Garment Industry" Computers in Inudstry, Elsevier Science Publishers. Amsterdam, NL vol. 19, No. 2, May 1, 1992 (May 1, 1992), pp. 185-191, 193.

Office Action issued in counterpart European application 00932820.4 dated Dec. 27, 2006.

Office Action issued in counterpart Canadian Application No. 2,376,772 dated Jan. 7, 2008.

Supplementary European Search Report issued in counterpart European Application No. 00 93 2820, dated Jan. 19, 2005.

Office Action issued in counterpart European Application No. 00 93 2820, dated Mar. 19, 2008.

Office Action issued in counterpart European Application No. 00 93 2820, dated Jul. 7, 2008, with claim sets filed May 8, 2008.

Office Action issued in counterpart European Application No. 00 93 2820, dated Jul. 17, 2008.

Canadian Office Action issued in Application No. 2,376,772 dated Nov. 10, 2008.

Pascal Volino et al., "The Evolution of a 3D System for Simulating Deformable Clothes on Virtual Actors"; MIRALab Copyright Information 1998.

\* cited by examiner

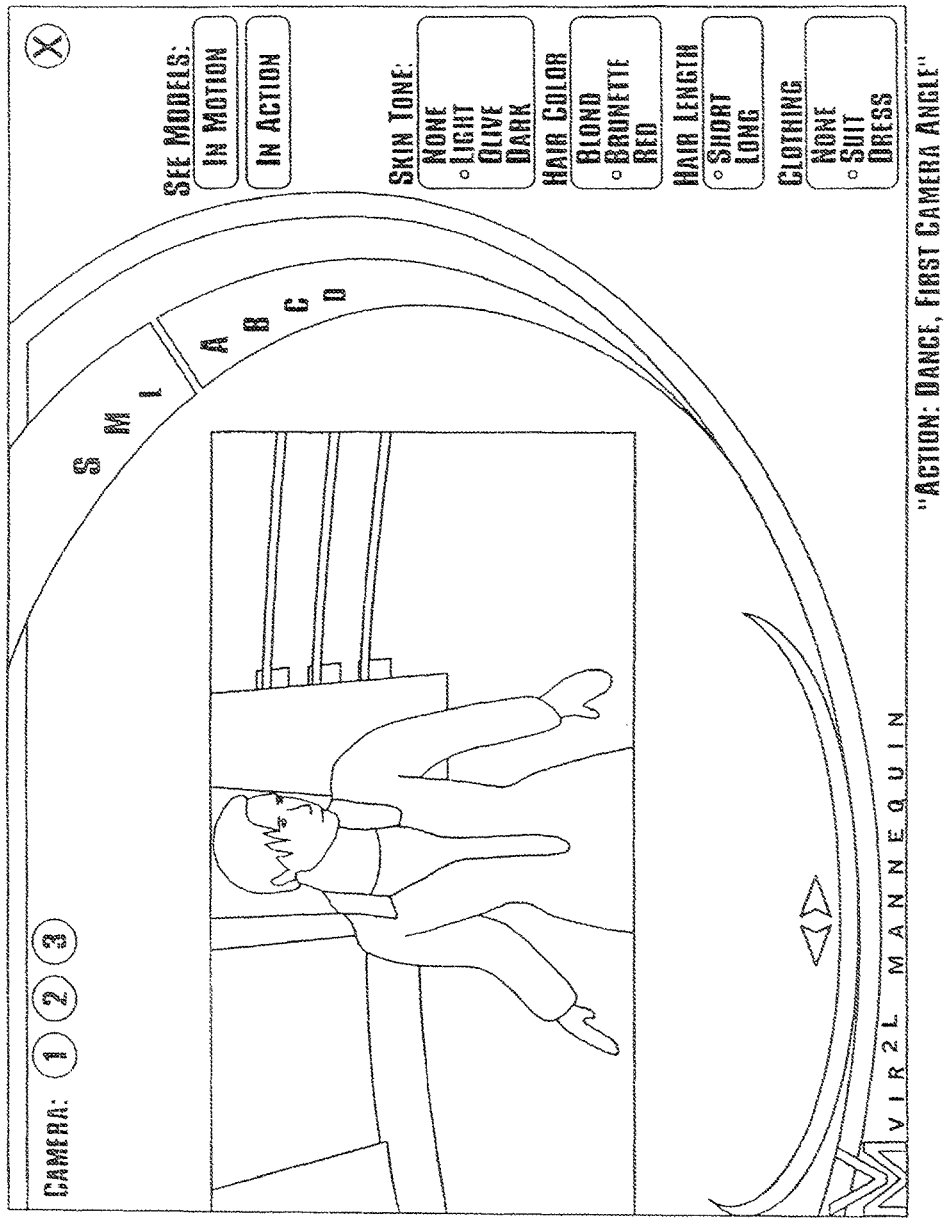

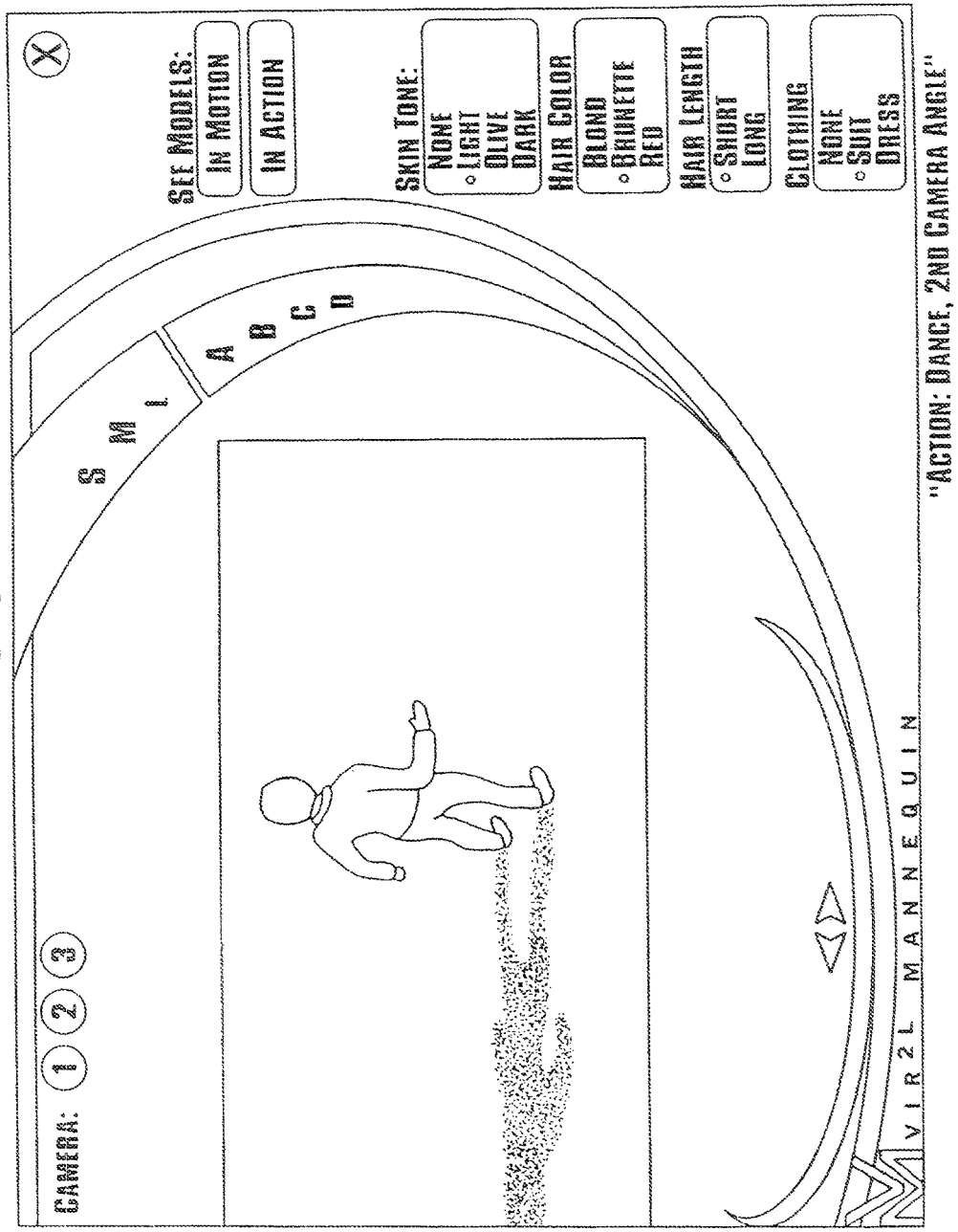

SYSTEM FOR DISPLAYING GARMENTS

This application is a continuation of application Ser. No. 13/453,827, filed Apr. 23, 2012, which is a continuation of application Ser. No. 12/343,144, filed Dec. 23, 2008, now U.S. Pat. No. 8,189,000, issued May 29, 2012, which is a continuation of application Ser. No. 11/627,549 filed Jan. 26, 2007, now U.S. Pat. No. 7,522,165, issued Apr. 21, 2009, which is a continuation of application Ser. No. 09/923,410 filed Aug. 8, 2001, now U.S. Pat. No. 7,212,202, issued May 1, 2007, which is a continuation of application Ser. No. 09/329,995 filed Jun. 11, 1999, now U.S. Pat. No. 6,404,426, issued Jun. 11, 2002. The entirety of all above-listed applications are incorporated herein by reference.

BACKGROUND OF THE INVENTION

Field of the Invention

The present invention relates generally to the field of virtual reality, and more particularly, to the accurate rendering of a three-dimensional model of a person wearing clothing and illustrating the fit and movement of the clothing.

Background of the Technology

Purchasers and potential purchasers of clothing items are able to conveniently preview clothing items displayed in a catalog, in retail stores, and in on-line catalogs. One of the frustrations of purchasers, however, is that clothing items when purchased and actually worn do not meet the expectations developed by the catalog or in the dressing room.

Models in catalogs tend to be taller and thinner than most purchasers, thus developing high expectations for the garment appearance. A garment worn by a person not having model-type proportions might look quite different and might not be flattering. Moreover, a garment that is photographed or tried on under studio or dressing room lights may have quite a different coloring and reflectivity in other settings, such as day light, candle light, office lighting, and so forth. A person's coloring also affects whether a particular garment is appropriate.

Furthermore, the manner of photographing a garment, typically in a front pose, does not demonstrate back and side fit, and the flow of the garment in various activities. Fitting rooms attempt to solve the problem of front, back and side views by using multiple mirrors. Even so, observing the back view of one's self in a fitting room can be awkward. Fitting rooms obviously do not permit much testing of a garment in an active activity situation, or observance of a garment from a distance. It is desirable, nevertheless, for a potential purchaser to observe the reaction of the garment to activities such as walking, running, sitting, and so on.

Clothing purchased for a different person, such as a gift, cannot be tried on before purchase. There is no practical way to preliminarily ascertain whether a particular garment will be flattering when worn and when in action.

Related Art

Various methods and systems for illustrating the look of a garment on a particular person have been attempted. U.S. Pat. No. 5,850,222 to Cone, has attempted a "virtual dressing room", in which a person's measurements are used to create a body data structure that represents the person's figure, by adjusting a standard body data structure. Unfortunately, a garment is represented by a two-dimensional image of the garment worn by a physical mannequin; the garment is inaccurately "stretched" to approximate the adjusted body structure, rather than representing the actual garment.

An on-line clothing catalog by Land's End, available at www.landsend.com, provides a two-dimensional, static representation of a personalized model wearing clothing specified by the user. The static, two-dimensional nature of the model neither permits various viewpoints of the model during activity nor observation of the garment's reaction to the environment.

U.S. Pat. No. 5,557,527 to Kotaki et al., concerns the mesh mapping of a simulated knit garment (loop simulation image) on a virtual mannequin, for use in conjunction with designing knit garments. The loop simulation image is dragged and distorted to fit over a scanned-in model of a person. Thus, although Kotaki starts with an accurate representation of a garment, the drawbacks of Cone are magnified in Kotaki. Additionally, Kotaki does not address the accurate representation of a person.

Other methods have attempted to compare garment measurements to standardized or personalized sizes. For example, in U.S. Pat. No. 5,530,652 to Croyle et al., a person and clothing are separately measured by a machine vision system. The data can be used to determine whether the garments are within tolerances, or to determine the best size of a particular piece of clothing for a person.

In a different field of application, computers have been used to study fabric characteristics, such as friction and wear. For example, in U.S. Pat. No. 5,495,568 to Beavin, a three dimensional model moves, such as raising the arms, bending, walking or running, and the response of a fabric model to motion, stretching and friction is evaluated. Computers have also been used to create and alter garment patterns to fit standard or individualized body measurements, as in U.S. Pat. No. 4,926,344 to Collins et al.

It is generally known in the field of computer graphics to manipulate three-dimensional objects, including shape and texture (U.S. Pat. No. 5,818,420 to Mitsumine et al.); to render three-dimensional objects in two-dimensional space (U.S. Pat. No. 5,745,666 to Gilley et al.) and vice-versa (U.S. Pat. No. 5,363,476 to Kurashige et al.); to manipulate two-dimensional objects in three-dimensional space (U.S. Pat. No. 5,729,673 to Cooper et al.); and to move or animate three-dimensional objects (e.g., U.S. Pat. No. 5,581,665 to Sugiura et al.; U.S. Pat. No. 5,577,175 to Naka et al.; and U.S. Pat. No. 5,483,630 to Unuma et al.).

Thus, there remains a need for a straightforward way for someone to view on a computer screen how a particular garment will look and flow on a particular person and/or in a particular setting. Further, there remains a need for accuracy in rendering such modeled garments.

BRIEF DESCRIPTION OF THE FIGURES

In the drawings:

FIGS. 9A-B are an illustration of the personalized computer-rendered model of a person in a specified action/environment, with varying camera angles, in accordance with an embodiment of the present invention.

DETAILED DESCRIPTION

Figure 1:
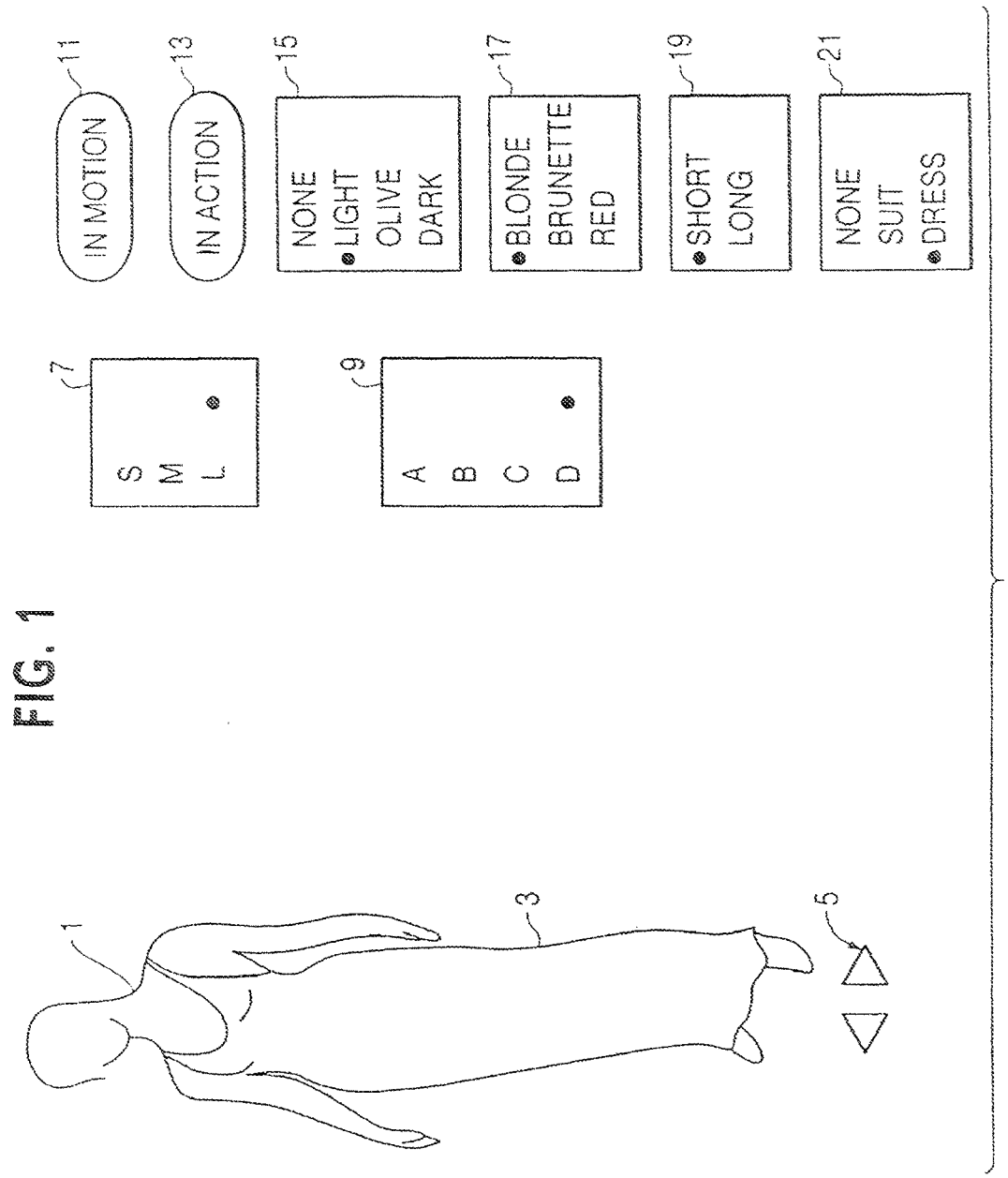
FIG. 1 is an illustration of a screen showing a personalized computer-rendered model of a person, in accordance with an embodiment of the present invention.

Reference is made to FIG. 1, illustrating a personalized, computer-rendered three-dimensional model of a person 1 wearing a garment 3. The model is provided with a rotational control 5. The user interface provides for a size selection control 7, a proportion selection control 9 and a clothing selection control 21. Further, the user interface provides for a motion selection control 11, an action/environment selection control 13, and controls for selection of skin tone, hair color, and hair length 15, 17, 19.

In the preferred embodiment, the computer model 1 of a person is rendered by any appropriate computer software for creating and displaying three-dimensional models. Preferably such software initially creates the model based on measurements and accurately depicts the sizing and proportion of the subject person. Alternatively, the model 1 may be based on standard sizes. It is advantageous for the computer model to be stored as a mesh database, further described below. One appropriate software package is sold by Autodesk® of San Rafael, Calif., under the trademark 3D Studio Max®.

Similarly, the garment 3 is rendered by appropriate computer software for creating three-dimensional models, preferably based on accurate measurements of the garment. Moreover, such software preferably takes into consideration garment qualities such as fabric drape, flow, and reflectivity. Advantageously, garment information may be stored in mesh format. Where the garments are sold in various sizes, a measurement of a garment of each size should be taken, and separate information on each garment size should be stored. An appropriate package for creating and displaying such mesh databases is sold under the aforementioned trademark 3D Studio Max®.

The rotational control 5 is provided, so that the user may rotate the computer model 1 to observe different aspects of the garment 3 as worn by the model 1. Here, the rotational control is provided in a vertical axis, to simulate a person turning left or right. Preferably, the rotational control provides full rotation of the model about the vertical axis in accordance with traditional animation principals. The rotational control is illustrated as a double arrow; it will be appreciated that there are many other methods for allowing a user to control rotation.

The size selection control 7 is provided so that the user may specify the overall size of the model 1 and garment 3. In the illustrated embodiment, the size options are small, medium, and large. A finer granularity may be applied, if desired, for example to select a full range of standard women's dress sizes.

Since most individuals are not perfect fits for standardized sizes, the proportion selection control 9 is provided so that the user may fine-tune proportions. Advantageously, it is the most significant proportions, in terms of garment fit and appearance, that may be modified by the user. In the illustrated embodiment, the proportion selection control 9 allows selection of cup size A, B, C, or D. The cup size proportion selection is particularly suitable in connection with high-end designer clothing and lingerie applications. It may be desirable in other applications to include additional or alternative proportion selections, such as hips, derriere, waist, etc. Notably, the suggested and preferred proportion selection and its effect on the garment 3 may be observed in the rotated appearance of the model 1 in a three-dimensional aspect, rather than a rotated 2-dimensional aspect.

The static appearance of the garment does not tell the complete story of the garment's ornamental appearance. Contributing to the appearance is the flow of the garment in reaction to motion. For example, some garments provide for limited stride; other garments provide for dramatic contrast between back and front necklines; still other garments provide for fluttering hemlines, etc. Therefore, the motion selection control 11 is provided to place the model 1 in motion. In the simplest version, the motion selection control 11 places the model 1 in an abbreviated runway demonstration, that is, the model takes several paces forward, turns, and returns. More elaborate motion control could be provided if desired. For example, other patterns of motion could be provided. Alternatively, motion could be provided specific to a garment, in order to highlight certain features of a garment that might otherwise remain unobserved.

To further illustrate features of the garments, there is provided an action/environment selection control 13. This control places the model 1 into action in a specific environment. In the preferred embodiment, there is provided for each garment 3 a specific pattern of action for the model and environment that is displayed when the user selects the action/environment selection control 13. For example, when clothing control 21 specifies "suit", the computer determines that the model 1 is displayed with the suit 3, and the corresponding action/environment "discotech" is displayed. This particular action/environment provides numerous bright lights, such as would occur in a discotech; the model 1 strides in a pattern about the virtual discotech, while modeling the garment, in three dimensions. The action/environment illustrates the response of the garment to particular activity, such as stretching, fluttering, flow, highlights, sheerness, etc. Moreover, the action/environment permits the garment 3 to be illustrated in a setting designed to evoke a mood appropriate to the particular garment 3.

Preferably, additional controls are provided to permit adjustments to tailor the model's appearance to closely resemble a particular person. Such appearance controls advantageously include the skin tone selection control 15; the hair color selection control 17; and the hair length control 19. The skin tone selection control 15 allows the user to select one of a variety of skin tones and to apply the skin tone to the model 1. In the embodiment, the skin tones include none (a neutral gray), light, olive and dark. Of course, additional or fewer skin tones could be provided. The hair color control 17 similarly allows the user to select one of several hair colors and to apply the hair color to the model. In the preferred embodiment, the hair colors include blond, brunette and red; alternative or additional colors could be provided. The preferred embodiment also provides for selection of hair length via the hair length control 19. Here, two hair lengths are provided—short or long. Additional lengths or hair styles could be provided changing a texture. It will be appreciated that other controls could be provided to tailor the model's appearance, such as eye color and hair style; or that the controls could provide many more choices of hair color, for example.

The clothing selection control 21 provides the ability for the user to select one of several garments 3 which the model 1 will "wear". The preferred embodiment provides for a selection of no clothing, a suit or a dress as a selected garment 3. When the user selects a garment listed in the clothing selection control 21, the garment 3 is displayed on the model 1 as follows. The vertice information is stored in a mesh database. The set of garments from which a user may select should correspond to the garments available in a garment database, discussed in greater detail below. Where there are provided numerous garments in the garment database, the user interface may become more elaborate to permit selection of a particular garment, in accordance with known techniques. Further, it is possible for the user to select a combination of garments for the model 1 to "wear", for example, a skirt and blouse combination.

Figure 2:
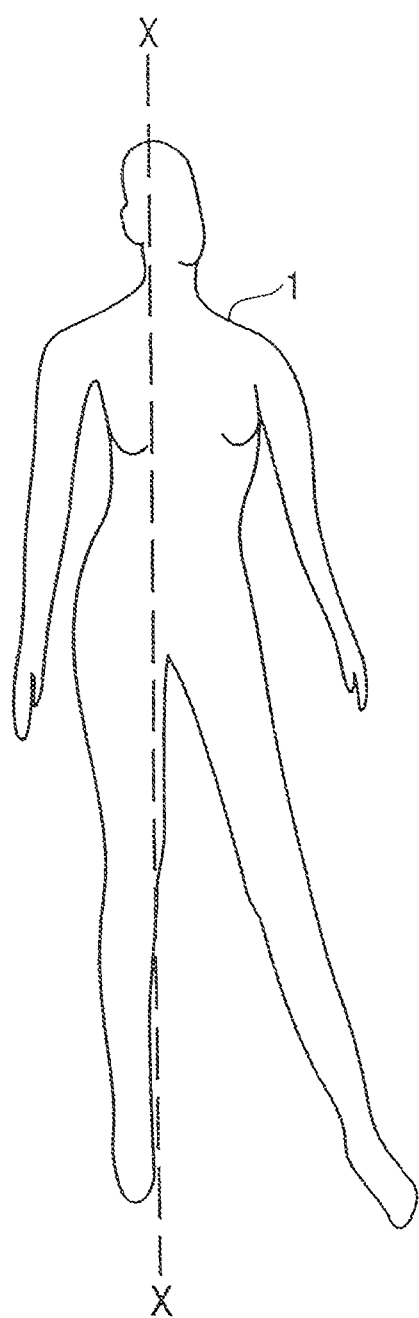
FIG. 2 is an illustration of a portion of a screen showing a computer-rendered model of a person prior to personalization, in accordance with an embodiment of the present invention.

FIG. 2 is an illustration of a portion of a screen showing a computer-rendered model 1 of a person prior to personalization. In the preferred embodiment, the model 1 may be provided with facial features, e.g., neutral or highly stylized. Further, the model 1 is illustrated in a neutral stance, preferably blocked at an angle to the viewer with arms and legs comfortably spaced to permit viewing of the garment 3 (not illustrated). When rotated by the rotational control 5, the model 1 in the preferred neutral stance will rotate about the vertical axis x. Alternative axes are, of course, possible. The model 1 may be provided with neutral or realistic anatomic features as preferred, in accordance with standard practice in this field. It is important that the model be three-dimensional and rotatable, so that the fit and appearance of the clothing may be observed from all angles.

Figure 3:
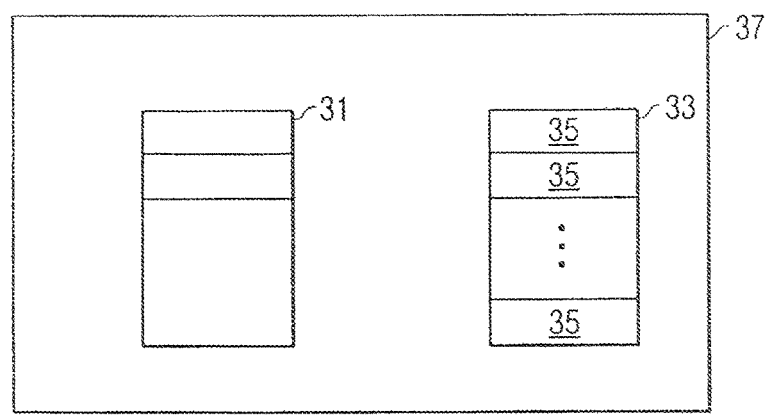
FIG. 3 is a block diagram showing the model database and virtual garment database, in accordance with an embodiment of the present invention.

FIG. 3 is a block diagram showing the model database 31 and virtual garment database 33 resident on a host computer 37. The model database 31 and garment database 33 should be capable of supporting an accurate three-dimensional rendering, preferably one that may be readily rotated and support altered environments. The data for the model database 31 is preferably selected as the designer desires, preferably to resemble a reasonably neutral figure which proportions would be acceptable as a base figure from where the proportions can be adjusted. In the preferred embodiment, the model 1 is stored in a model database 31 as mesh data. In order to provide adjustable size and proportions, the model database 31 stores mesh data corresponding to each adjustable size. For example, in the illustrated embodiment, the model database 31 stores the entire mesh data for a small model 1, a medium model 1, and a large model 1. The various proportions selected by the proportion control are stored as mesh data for the affected body part only; the mesh data for the proportion is blended to the mesh data for the model when selected by the user. For example, in the illustrated embodiment, the model database 31 also stores the proportion mesh data for cup sizes A, B, C, and D.

Similarly, the garment database 33 is preferably provided as mesh data. For each garment in each size, the garment database 33 stores garment data 35. However, it is possible for the garment database 33 to store basic mesh data for a garment, and for the garment to be adjusted according to the user-selected size and proportion(s). The data for each garment is created by the artist in order to accurately reflect the appearance, color, material (including reflection), material flow, texture, for example.

Figure 4:
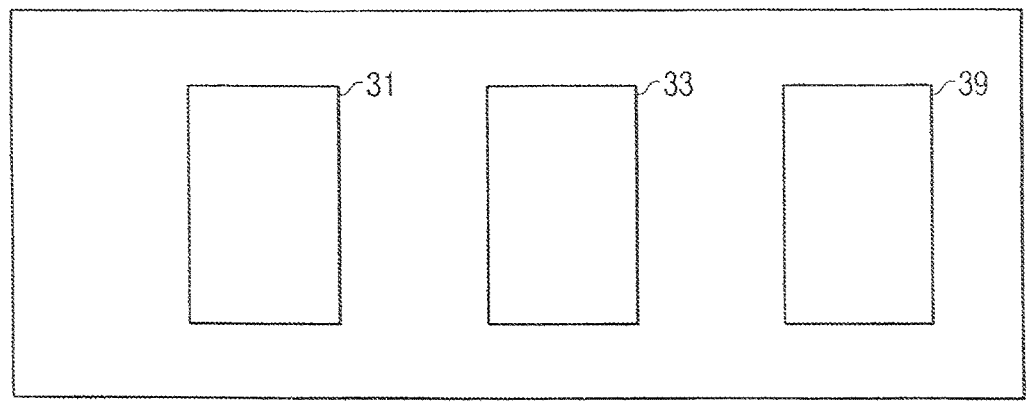
FIG. 4 is a block diagram showing the model database, virtual garment database, and environment database in accordance with an embodiment of the present invention.

FIG. 4 illustrates the model database 31 and virtual garment database 33 in connection with an optional environment/action database 39. The environment/action database 39 contains data sufficient to render scenery, lighting, special effects, and to place the model 1 in motion on the screen. In the preferred embodiment, the environment/action database 39 contains one or more of the following elements:
Scenery
Lighting
Special effects
Model motion (scenery, light, textures, sound, music, streaming video. A script determines the model movement and other action in the scenery such as waves on a beach birds, etc.)

Figure 5:
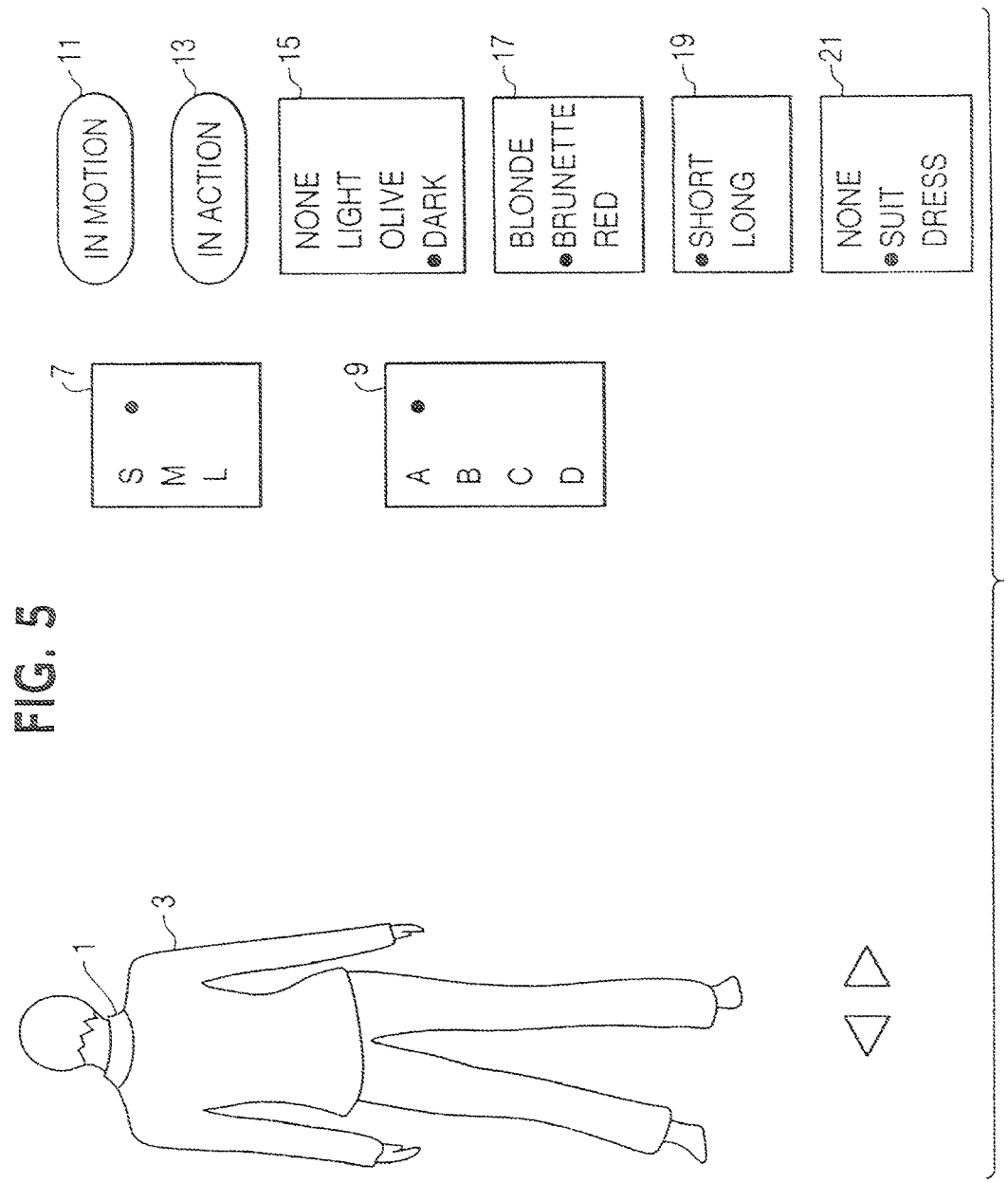
FIG. 5 is an illustration of a portion of a screen showing a personalized computer-rendered model of a person, showing rotation of the model, in accordance with an embodiment of the present invention.

FIG. 5 illustrates the model 1 with selections different from that illustrated in FIG. 1, illustrated as rotated 180 degrees. Here, the model 1 has a size selection control 7 at "small", proportion selection control 9 at "A", skin tone selection control 15 at "dark", hair color selection control 17 at "brunette", and hair length selection control 19 at "short." The clothing selection control 21 has selected "suit" as the garment 3.

Figure 6:
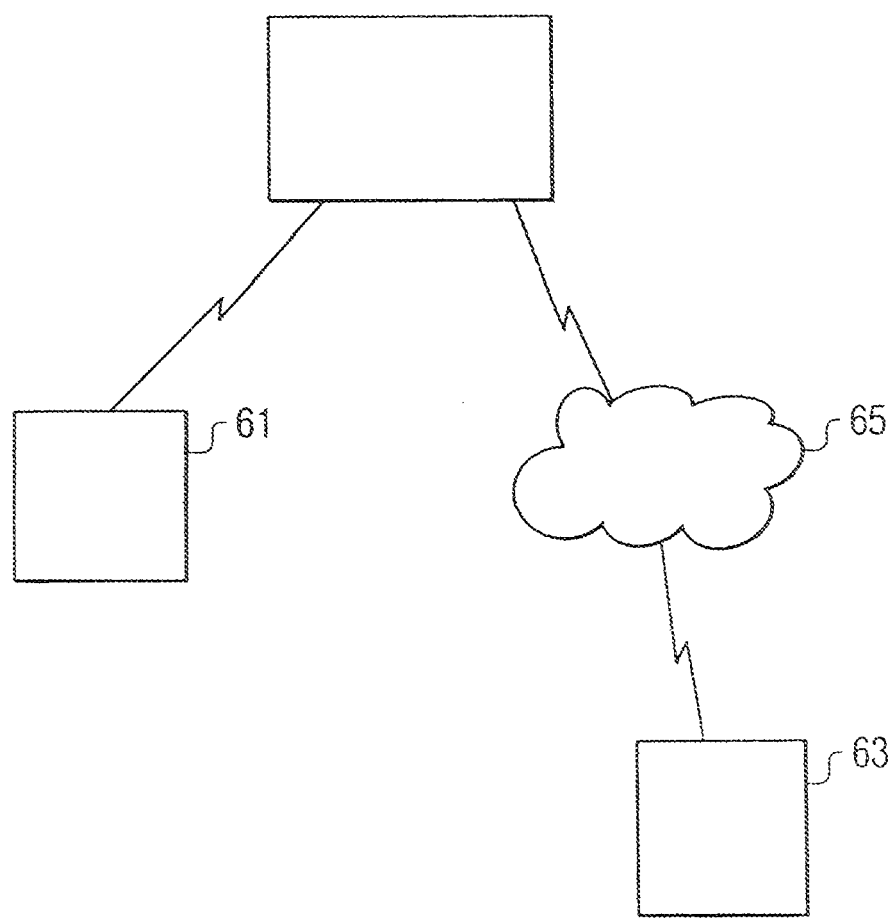
FIG. 6 is a block diagram illustrating the computer-rendered three-dimensional mannequin utilized in an on-line catalog application accessible over the Internet, in accordance with an embodiment of the present invention.

FIG. 6 is a block diagram illustrating the computer-rendered three-dimensional mannequin utilized over the internet. The computer-rendered three-dimensional mannequin can be accessed by a local user 61 or other user with direct communications connection to the host 37. The mannequin can also be accessed by a remote user 63 via internet 65, an intranet, a cable modem, or other network access.

Advantageously, the mannequin is incorporated into an interactive on-line clothing sales catalog. In that instance, the garment database 33 is created as described above from clothing offered in the catalog.

Figure 7:
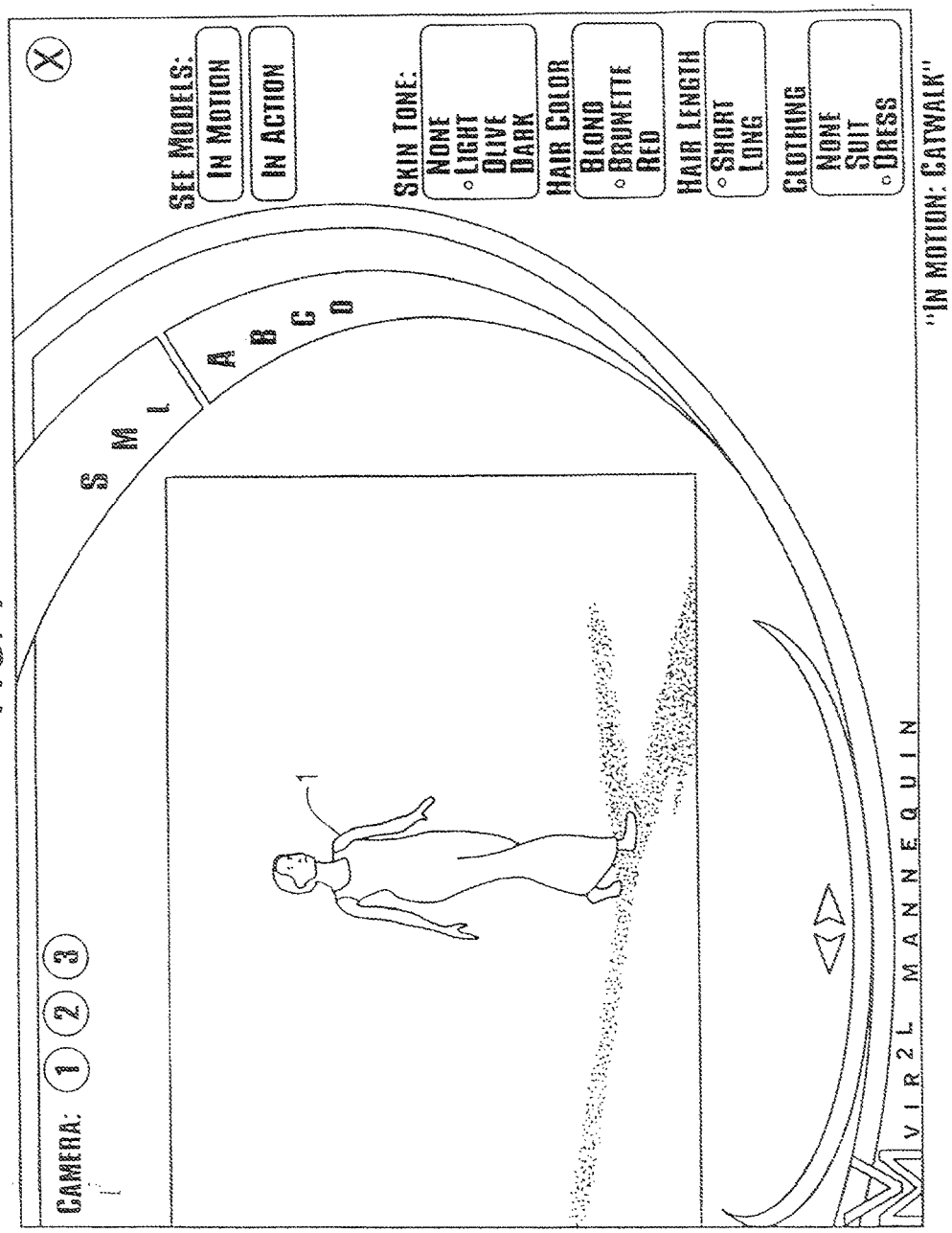
FIG. 7 is an illustration of the personalized computer-rendered model of a person, with action, in accordance with an embodiment of the present invention.

FIG. 7 is an illustration of the model 1, with action. In this illustration, the model 1 walks on a catwalk, in accordance with motion listed in a script.

Figure 8:
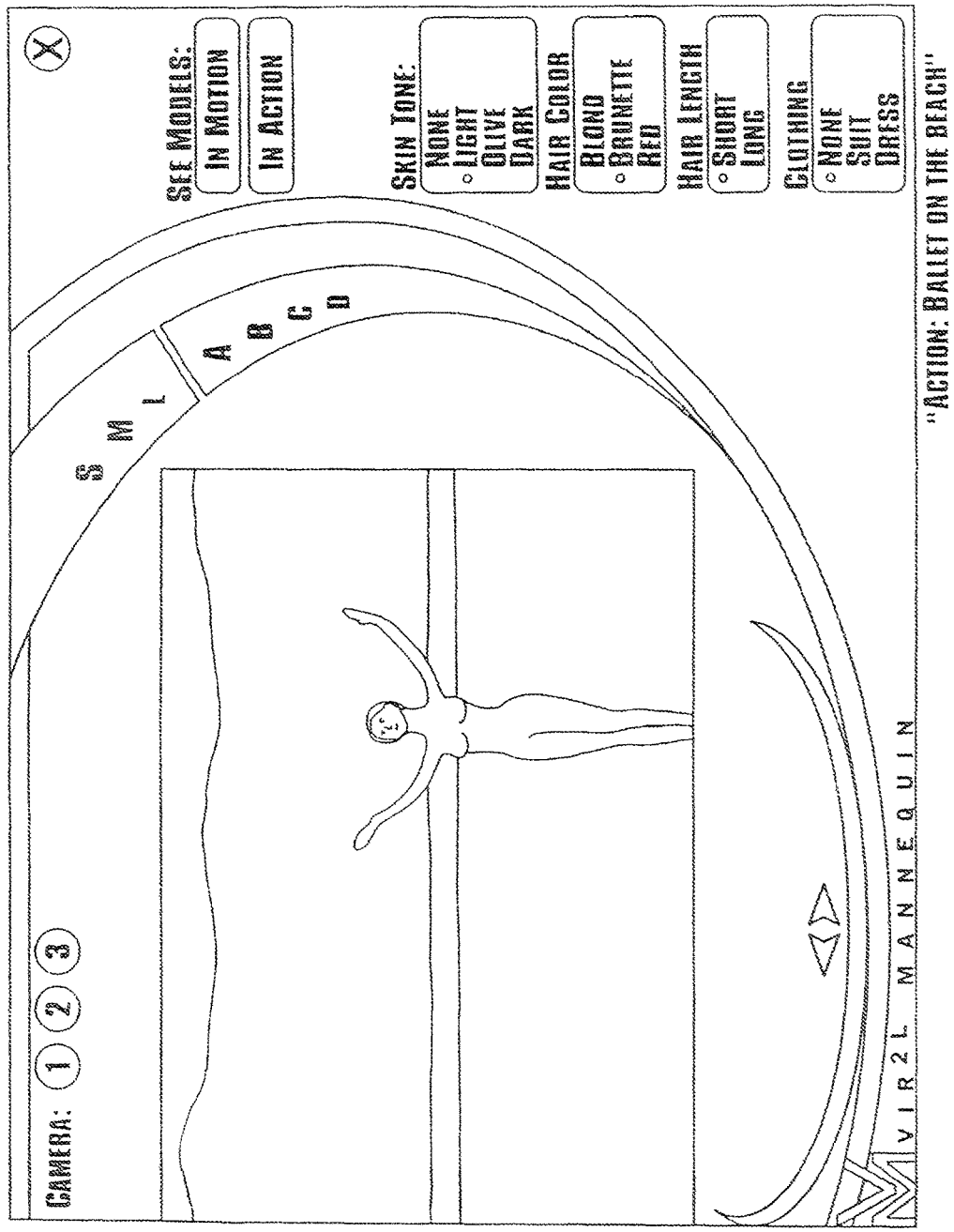
FIG. 8 is an illustration of the personalized computer-rendered model of a person, with a specified action/environment, in accordance with an embodiment of the present invention.

FIG. 8 is an illustration of the model 1, within a specified action/environment. Here, the environment is a beach. Note that the environment includes motion, such as waves lapping on a shore, and a breeze. A garment 3 illustrated in such an environment would react to the breeze, and to the motion of the model. The model would move in the environment in accordance with a script.

FIGS. 9A-B are an illustration of the personalized computer-rendered model of a person in a specified action/environment, with varying camera angles. Here, the model 1 is illustrated in a discotheque. The first camera angle as shown in FIG. 9A is a close up front view. The second camera angle as shown in FIG. 9B is a rear flyover camera angle. Other camera angles could be provided. The model 1 is clearly 3-dimensional.

Reference is made again to FIG. 1. The computer-rendered three-dimensional mannequin is utilized by a user as follows. Initially, the system displays a default model 1, and selection and feature controls 7, 9, 11, 13, 15, 17, 19 and 21. In the preferred embodiment, the default model 1 has intermediate size and proportions, with no motion, action or garment selected, as illustrated in FIG. 2. The default model alternatively could be set, for example, to any other combination of sizes, proportions, clothing, etc; or could be set using a cookie to a prior model utilized by the user.

Utilizing the selection and feature controls 7, 9, 11, 1, 15, 17, 19 and 21, in no particular order, the user personalizes the model 1. The user selects one of several sizes using the size selection control 7; and selects one of several proportions using the proportion selection control 9. Although the illustrated embodiment provides proportion selection control only for cup size, alternative or additional proportions may be provided for, as discussed above. If desired, the user selects one of several features via the feature controls 15, 17, 19 for skin tone, hair color and hair length. Preferably, as each selection is made by the user, the model 1 is automatically modified to reflect the selection.

The user utilizes the clothing selection control 21 to select one of several garments that may be "worn" by the model 1. The clothing selection control 21 also provides for a garment selection of "none", in which the model 1 is unclothed. When utilized in connection with an on-line or interactive catalog, the clothing selection control 21 provides a selection of garments corresponding to those garments available from the catalog or manufacturer. Where there are numerous garments, a more detailed user interface should be provided to select an appropriate garment, garment color, etc. from the catalog.

The user rotates the model 1 utilizing the rotational selection control 5.

In order to observe the model 1 (and garment) in motion, the user selects the motion selection control 11. The model 1 is then displayed in motion on the computer screen, following a pre-set pattern of motion. In order to observe the model 1 (and garment if selected) in action and in an environment, the user selects the action control 13. There are provided several actions and environments. In the preferred embodiment, the action and environment corresponds to the garment selected by the user; thus, when the user selects the action selection control 13, the action is automatically selected to correspond to the garment selected by the user. While an environment/action is selected, the user may select one of several camera angles for observing the model in action.

The user may change the garment on the model by selecting the garment selection control 21. Similarly, the user may adjust the size, proportions or feature selections by selecting one of the controls 7, 9, 15, 17, 19.

Although the model as illustrated and discussed is a female model, it will be appreciated that the principles herein readily could be applied to a male model or a child model.

The system could be provided to a local user, on a central system. Alternatively, the garment data and/or model data could be stored on a disk, and provided to a user on a periodic basis (for example as a catalogue) l; with the controlling software provided on a central system accessible to the user via communications. Alternatively, the system could be made available via a multiple-user communications system, such as the internet.

While the preferred mode and best mode for carrying out the invention have been described, those familiar with the art to which this invention relates will appreciate that various alternative designs and embodiments for practicing the invention are possible, and will fall within the scope of the following claims.

What is claimed:

1. A system for displaying at least one garment, comprising:
    a model rendering control for rendering a three-dimensional, rotatable virtual model using information stored in a mesh format; the virtual model rendered using information stored in a mesh format;
    a size selection control for selecting at least one of a plurality of sizes, the sizes to be applied to the model;
    a proportion control for controlling at least two proportions, wherein various proportions selected by the proportion control are stored as mesh data for an affected body part only and the mesh data for the proportion is blended to the mesh data for the model when selected by a user;
    a characteristic control for varying changeable characteristics of the model; and
    a fabric rendering control for rendering virtual fabric in three dimensions, the virtual fabric to be virtually fitted to the model, the virtual fabric rendered using information stored in a mesh format.

2. The system of claim 1, wherein the changeable characteristics of the virtual model include skin tone, general body shape and size, hair color, or hair length, or any combination thereof.

3. The system of claim 1, wherein the virtual fabric is rendered in three dimensions via input of a plurality of measurements of an actual garment.

4. The system of claim 1, wherein the virtual fabric includes fabric qualities.

5. The system of claim 4, wherein the fabric qualities comprise: fabric drape, fabric flow, fabric elasticity, or fabric reflectivity, or any combination thereof.

6. The system of claim 1, further comprising a motion selection control for selecting a motion to be applied to the model.

7. The system of claim 1, further comprising an action selection control to apply an action to the model, wherein the action selection control automatically selects the action corresponding to the selected garment from a plurality of actions.

8. The system of claim 1, further comprising a rotation selection control for rotating the model about a vertical axis.

9. The system of claim 1, further comprising stored data corresponding to: each of a plurality of models; the at least two proportions; or the at least one garment; or any combination thereof.

10. The system of claim 1, further comprising a centralized computer on which the model is rendered, and a remote computer on which the model is displayed.

11. The system of claim 1, further comprising at least one action and/or environment selection control causing the selected at least one garment on the at least one model to react to the at least one action and/or the at least one environment.

12. The system of claim 1, wherein the at least one environment includes scenery, lighting, special effects, sound, music, or streaming video, or any combination thereof.

13. The system of claim 1, wherein the at least two proportions include: at least one cup size proportion, at least one hip proportion, at least one derriere proportion, or at least one waist proportion, or any combination thereof.

14. The system of claim 1, wherein the at least one garment is rendered in three dimensions via input of a plurality of measurements of at least one physical garment.

15. The system of claim 1, wherein the at least one garment illustrates qualities comprising: appearance, color, material, reflection, material flow, texture, stretching, fluttering, flow, highlights, fabric drape, or sheerness, or any combination thereof.

* * * * *